(12) United States Patent
Subramanian et al.

(10) Patent No.: US 9,413,649 B2
(45) Date of Patent: Aug. 9, 2016

(54) VIRTUAL NETWORK DEVICE ARCHITECTURE

(75) Inventors: Krishnamurthy Subramanian, Mountain View, CA (US); Rahul Kulkarni, Sunnyvale, CA (US)

(73) Assignee: Force10 Networks, Inc., San Jose, CA (US)

( * ) Notice: Subject to any disclaimer, the term of this patent is extended or adjusted under 35 U.S.C. 154(b) by 987 days.

(21) Appl. No.: 12/722,568

(22) Filed: Mar. 12, 2010

(65) Prior Publication Data

US 2011/0225207 A1 Sep. 15, 2011

(51) Int. Cl.
*G06F 7/00* (2006.01)
*H04L 12/713* (2013.01)

(52) U.S. Cl.
CPC .................. *H04L 45/586* (2013.01)

(58) Field of Classification Search
CPC ............ G06F 2009/45533; G06F 2009/45558; G06F 9/45533; G06F 17/30002; H04L 67/10; H04L 67/1008; H04L 67/101; H04L 67/1021; H04L 67/1029; H04L 45/586
USPC ............. 707/781, 785–788; 726/15; 370/238, 370/351, 355–356, 397–399, 395.31, 409; 379/220.01, 220.02, 265.11, 271–272, 379/221.14–221.14; 455/428, 445; 709/238
See application file for complete search history.

(56) References Cited

U.S. PATENT DOCUMENTS

| | | | | |
|---|---|---|---|---|
| 7,613,836 | B2* | 11/2009 | Tober | H04L 45/586 370/389 |
| 7,715,381 | B2* | 5/2010 | Shen | H04L 12/4679 370/254 |
| 8,018,955 | B2* | 9/2011 | Agarwal et al. | 370/401 |
| 2002/0165961 | A1* | 11/2002 | Everdell | H04L 41/22 709/225 |
| 2003/0177395 | A1* | 9/2003 | Pardee et al. | 713/201 |
| 2003/0177396 | A1* | 9/2003 | Bartlett et al. | 713/201 |
| 2004/0233913 | A1* | 11/2004 | Shen | 370/395.31 |
| 2007/0058632 | A1* | 3/2007 | Back et al. | 370/392 |
| 2008/0177994 | A1* | 7/2008 | Mayer | 713/2 |
| 2009/0063665 | A1* | 3/2009 | Bagepalli et al. | 709/222 |
| 2009/0063747 | A1* | 3/2009 | Bagepalli et al. | 710/313 |
| 2009/0129271 | A1* | 5/2009 | Ramankutty et al. | 370/235 |
| 2009/0276771 | A1* | 11/2009 | Nickolov et al. | 717/177 |
| 2009/0285225 | A1* | 11/2009 | Dahod | 370/401 |
| 2009/0307334 | A1* | 12/2009 | Maltz et al. | 709/219 |
| 2010/0023576 | A1* | 1/2010 | Tober et al. | 709/201 |
| 2010/0306408 | A1* | 12/2010 | Greenberg et al. | 709/238 |
| 2011/0134931 | A1* | 6/2011 | Merwe et al. | 370/401 |

\* cited by examiner

*Primary Examiner* — Mariela Reyes
*Assistant Examiner* — Linh Black
(74) *Attorney, Agent, or Firm* — Haynes and Boone, LLP

(57) ABSTRACT

A network device such as a router or a switch is comprised of a control module and a plurality of physical line cards. The control module includes a control processor virtual machine, a plurality of route processing virtual machines and one or more instances of a line card virtual machine. The line card virtual machine operates to receive routing information base update information, to modify the routing information base according to the update information and to update each instance of a plurality of forwarding information bases included on each of the physical line cards.

21 Claims, 9 Drawing Sheets

VIRTUAL NETWORK DEVICE ARCHITECTURE

FIELD OF INVENTION

The invention relates generally to the technical area of network switch and router architecture and specifically to a network switch or router architecture that is comprised of virtualized control and data plane functionality.

BACKGROUND

Modular network routers or switches (network devices) typically include a chassis with separate cards or modules for the provision of different functions associated with their operation. Such a modular architecture can include a control module that operates to provide overall control of the network device operation and to provide routing and/or switching protocol functionality (all generally referred to as control plane functions), one or more line cards to provide packet processing and forwarding functionality (generally referred to as data or forwarding plane functions) and one or more switching cards to switch packets between the line cards. All of these cards can be connected to a backplane that is arranged in the network device chassis. FIG. 1 generally illustrates this prior art switch architecture.

The switch/router 10 in FIG. 1 includes a control module and a plurality of line cards all connected by a switch fabric. The control module is comprised of three CPUs, CPU-A, CPU-B and CPU-C, each of which operates to perform different functionality in support of the overall system operation. In this case, CPU-A can be dedicated to certain management functions such as user interface management, system chassis management, system configuration management and management of system security to name only a few functions. CPU-B can be dedicated to running layer 3 routing protocols such as the border gateway protocol (BGP), the open shortest path first (OSPF) protocol, routing information protocol (RIP) to name just a few and CPU-C can be dedicated to running layer 2 switching protocols such as the Internet group management protocol (IGMP), address resolution protocol (ARP), spanning tree protocol (STP) and the virtual router redundancy protocol (VRRP) to name just a few. The routing protocols running in CPU-B generally send messages to and receive messages from the surrounding network devices in order to learn certain information about these devices and their relationship to the network. This information can include their IP address, distance information, link attributes, group membership information to name only a few. The switching protocols running in CPU-C generally gather information from the packets being processed by the host device, which in this case is the router 10. This information can include the MAC address and the port I.D. of another network device. The information received by the protocols running on CPU-B and CPU-C can be used to derive the shortest path from the host network device to another, neighboring network device or to calculated the distance between two network devices, to calculate a next hop address for instance or spanning trees and other information used to construct and maintain layer 2 switching tables and layer 3 routing tables. The switching table and routing table information is then made available to the line cards which use this information to update forwarding tables which it uses to process packets or frames of information arriving at the router 10.

Continuing to refer to FIG. 1, each of the line cards includes a CPU which is largely dedicated to running processes to support the construction and maintenance of layer 2 and/or a layer 3 forwarding tables stored in memory on each of the line cards. The information contained in each of the layer 2 and layer 3 forwarding tables stored in each line card is substantially the same. There are other tables stored and maintain by each of the line cards as well, and each of these tables can include different information. These tables can be an ingress L2 access control list (ACL) table, VLAN membership table, L2 QoS table, MPLS forwarding table and a next hop table to name only a few. Each of the line card CPUs also is responsible for running a MAC agent and a FIB agent. The MAC agent is primarily responsible for communicating with some of the layer 2 processes running on CPU-C of the control module to identify and receive commands or actions they need to take regarding the maintenance of the layer 2 forwarding table(s). The FIB agent is primarily responsible for communicating with some of the layer 3 processes running on CPU-B of the control module to identify and receive commands or actions they need to take regarding the maintenance of the layer 3 forwarding table(s).

Each line card is designed to support some fixed number of input/output ports (ports) that operate in the data plane to receive packets from and transmit packets to the network to which the network device is connected. Each port is typically designed to process a maximum number of packets or bytes per second. As the volume of network traffic increases, it becomes necessary to design network devices, such as routers and switches that have the capability to handle the increased volume of traffic. Generally, the solution to this problem has been to add additional resources. One solution to this problem is to design line cards that are capable of processing and forwarding the packets more rapidly. Another solution to this problem is to add more ports to each of the line cards. Typically, both of these solutions are implemented together, in which case it may be necessary to add additional components to the line card in order to support the additional ports. As there is a finite amount of space on each line card to support all of the functionality associated with it (additional memory and packet processing devices, etc), adding more resources to a line card can necessitate increasing its dimensions which is not always desirable or possible. Consequently, it is desirable to design a network device that operates to very efficiently utilize the resources provided for processing packets and frames of information and for running the various network protocols.

SUMMARY

We have discovered that it is possible to very efficiently utilize processing and storage resources comprising a network device by virtualizing one or more control and data plane processes running on the network device. Further, we discovered that virtualizing one or more control and data plane processes obviates the need for line card processors used to implement the control and data plane processes. Still further, the virtualization of one or more control and data plane processes eliminates the need for one or more CPUs to support the layer 2 and layer 3 protocols, and frees up space on the line card for additional ingress and egress ports. As a consequence, the system uses less power, the system cost is lowered, the system processing and memory resources are very efficiently utilized, less memory is used to maintain the forwarding tables and to store the line card agents and the line cards are highly available.

In one embodiment, a network device is comprised of a plurality of physical line cards that include ingress and egress ports and means for processing and forwarding one or more packets of information, and each one of the plurality of physical line cards is in communication with one or more virtual processes that operate to support the packet processing and forwarding means. From another perspective, a method of operating a network device comprises one or more virtual processes that receive information that they use to modify a first database, an agent running on at least one of the one or more virtual processes that detects the modification to the first database, and the agent using some information associated with the modification to the first database to modify a second database included in a physical line card.

DETAILED DESCRIPTION

Figure 2:
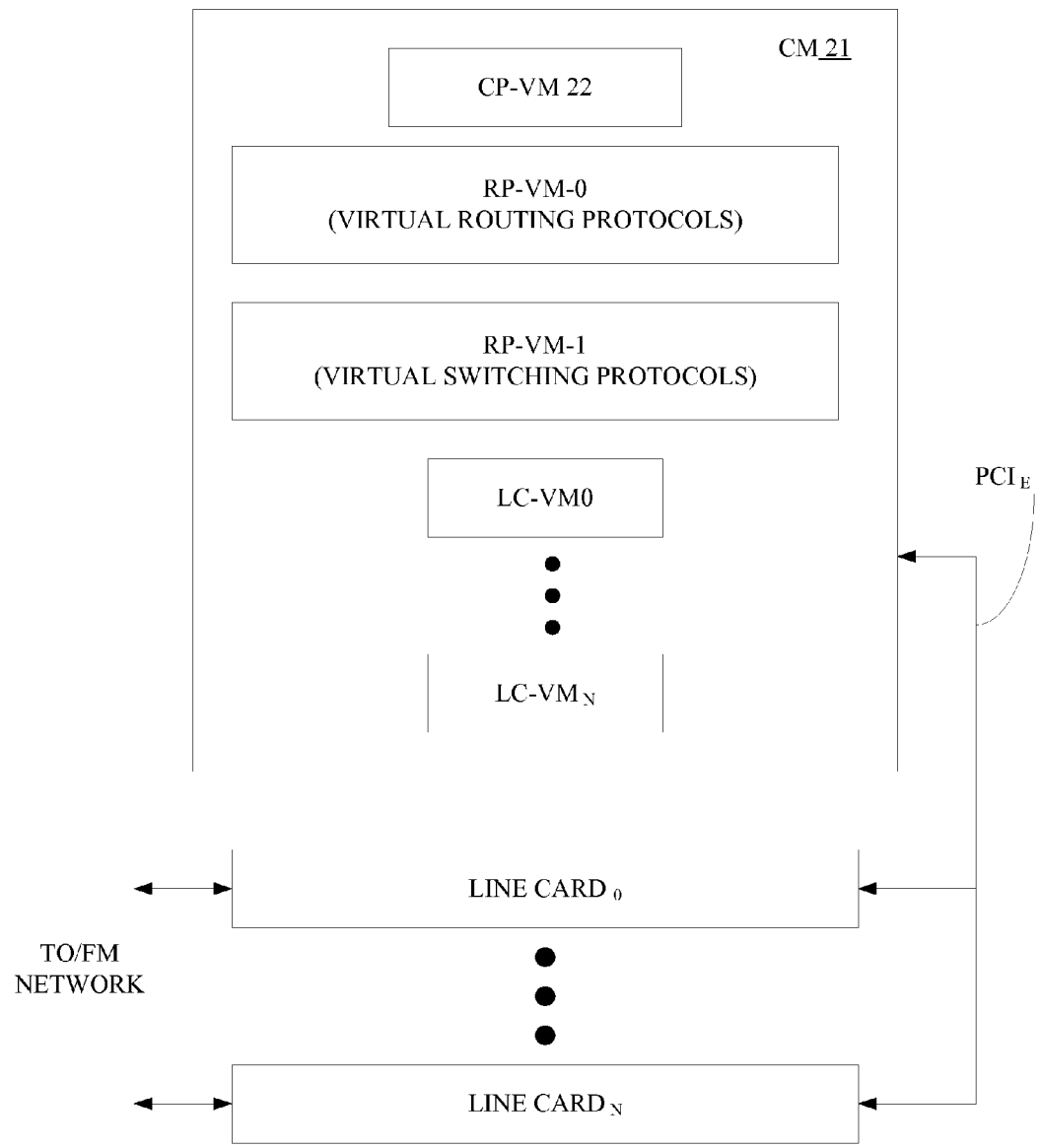
FIG. 2 is a block diagram of a network device showing a control module that includes a number of line card virtual machines and their associated physical line cards.

FIG. 2 is a high level functional block diagram of a network router or switch 20, hereinafter referred to as the network device 20, comprised of a control module (CM) 21 and a plurality of line cards $LC_0$-$LC_n$) connected to each other over a standard inter-process communication bus such as a PCIe bus. It should be understood that the network device 20 typically also includes other functional modules, such as one or more switching modules and a back plane, but the functionality of these other modules is not important for the purpose of this description and so will not be discussed in any detail here. The CM 21 can be comprised of a number of virtual processes which in this case includes a control processor virtual machine (CP-VM) 22, a first rout processing virtual machine (RP-$VM_0$), a second rout processing virtual machine (RP-$VM_1$) and a plurality of line card virtual machine instances (LC-$VM_0$-LC-$VM_n$). Each of the LC-VMs operates in conjunction with only one of a plurality of respective physical line cards ($LC_0$ to $LC_n$). So for example, LC-$VM_0$ operates in conjunction with $LC_0$ and LC-$VM_1$ operates in conjunction with $LC_1$ and each of the LC-VMs is in communication with its respective LC over the PCIe bus. Although all of the individual processes running in the CM 21 are described as virtual processes, not all can be running in a virtual manner. Some can be running on CPU devices and some can be running under the control of a supervisory virtual process. Regardless, in the case where all of the CM 21 processes are running in a virtual manner, the CM 21 can be referred to as a virtual control module.

Figure 1:
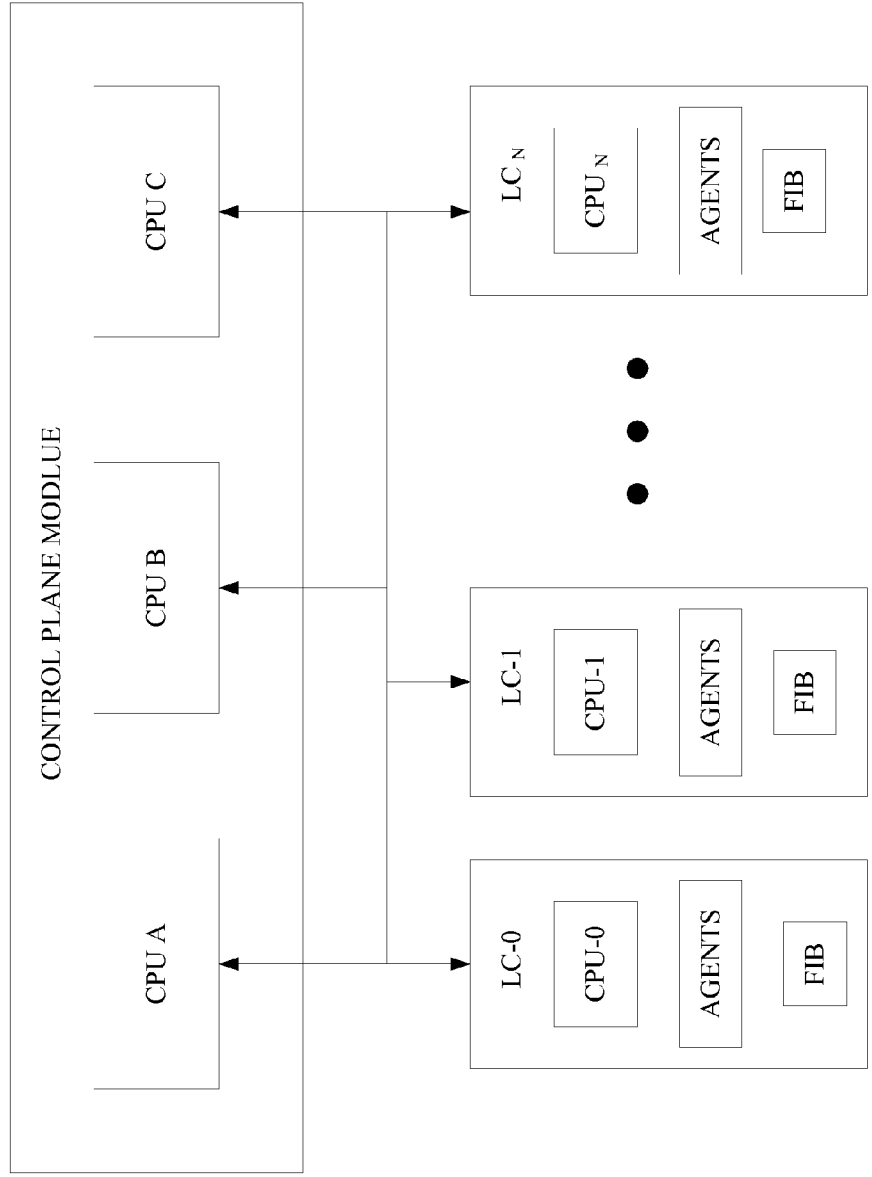
FIG. 1 is a block diagram of a prior art router/switch architecture showing one control module and a number of line cards interconnected over a switch fabric.

As will be described in detail later with reference to FIG. 3A, the functionality comprising the CP-VM 22, RP-$VM_0$ and RP-$VM_1$ is performed in a virtual manner by, in this case, a single CPU in the CM 21 operating under the control of a specially modified operating system and a hypervisor. However, it should be understood that the functionality associated with each of the CP-VM 22, the RP-$VM_0$, RP-$VM_1$ and LC-VMs can also be run by separate CPUs. That is, a different CPU can be responsible for running the functionality associate with the CP-VM 22, the RP-$VM_0$, the RP-$VM_1$ and the LC-VMs. The CP-VM 22 generally manages the overall operation of the network device 20 and is comprised of the same functionality as that of CPU-A of FIG. 1. Specifically, the CP-VM 22 can manage the users interface to the network device, it operates to provide overall control of the network device chassis, it can run a simple network management protocol (SNMP), it can run a configuration manager, it can run a remote authentication dial-in user service (Radius) to only name some of the functionality. The RP-$VM_0$ and RP-$VM_1$ have overall responsibility for running a plurality of networking protocols. Specifically, RP-$VM_0$ is responsible for running layer 3 routing protocols and some layer 3 control and management functions such as those run by CPU-B of FIG. 1. A list of these routing protocols and other functions can include BGP, OSPF, LACP, RIP, RSVP, Diffserv manager and MPLS controller. The RP-$VM_1$ is responsible for running a number of layer 2 switching protocols and layer 2 management functions such as those run by CPU-C of FIG. 1. A listing of the switching protocols running on the RP-$VM_1$ can include STP/xSTP, VRRP, multicast, IGMP, PIM and NDPM and it also runs a layer two manager and an ARP manager.

Substantially all of the functionality comprising the CP-VM 22, RP-$VM_0$, $VRMP_1$ and the LC-VMs runs in what is typically referred to as a control plane, and substantially all of the functionality comprising the line cards ($LC_0$-$LC_n$) runs in what is typically referred to as a forwarding plane. The control plane is typically associated with network device 20 functionality responsible for gathering and processing information from the surrounding network and from packets or frames being processed in the data plane at any of the line cards (0-N) comprising network device 20. This information is used to construct and maintain layer 2 tables such as a MAC table and layer 3 tables such as a routing table. These layer 2 and layer 3 tables are referred to in this description collectively as the first database. The data plane functionality is typically associated with the network device functionality implemented on a line card that is responsible for processing packets or frames of information received by the network device from the surrounding network to determine how to forward the packets. Decisions about how to forward these packets or frames are made using information stored in a layer 2 and/or layer 3 forwarding tables collectively referred to here as a forwarding information base (FIB). In order to support very high data rates through the network device and to permit a large number of ports to be implemented on each of the line cards, the control and data plane functionality is strategically partitioned between the control module 21 and the line cards (0-N). This architecture results in the removal of the CPUs ($CPU_0$-$CPU_n$) and the associated line card software (MAC and FIB agents) from each of the line cards ($LC_0$-$LC_n$) in FIG. 1. Each of the instances of the line card software removed from each line card can be implemented in a separate one of the LC-VM (0-N) instances running on the CM 21. The removal of the CPUs and associated software from each of the line cards results in freeing up space (no CPU and less memory) on each line card which can be used to implement additional ports which has the effect of increasing the volume of traffic through the network device.

Figure 3A:
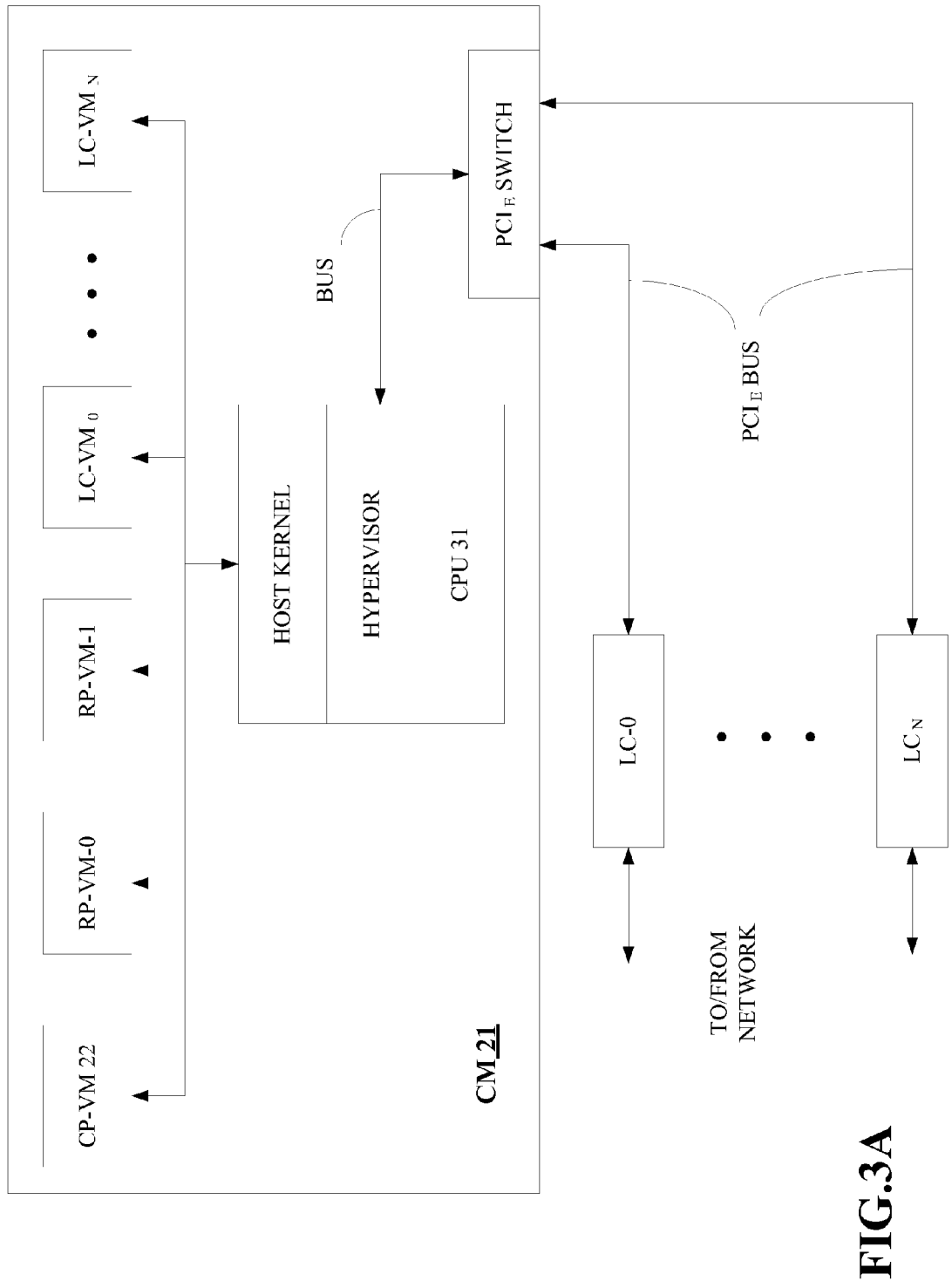
FIG. 3A is a detailed block diagram of one embodiment of the network device of FIG. 2.

FIG. 3A is a block diagram of an embodiment of the network device 20 architecture showing functionality comprising the CM 21 included in the network device 20 of FIG. 2. CM 21 is comprised of the CP-VM 21, the RP-VM$_0$, the RP-VM$_1$ and the plurality of LC-VMs 0-N of FIG. 2 each of which are in communication with a host operating system over a virtual machine (VM) bus referred to here as an inter-process communication (IPC) bus. The host operating system runs on top of a hypervisor which in turn runs on top of a multi-core CPU 31 or simply CPU 31. The CPU 31 is connected over a bus (CPU bus) to an PCIe switch 32 which generally operates to switch signals from the CM 21 to one or more of the line cards (LC$_0$-LC$_n$) or to receive signals from the line cards over a serial bus which in this case is a PCIe bus. It should be understood that FIG. 3A is a logical representation of the functionality comprising the CM 21. The instructions/software/firmware used to implement the virtual machines represented by the CP-VM 22, the RP-VM$_0$, RP-VM$_1$ and the LC-VMs as well as the host kernel and the hypervisor are stored in memory or a mass storage device accessible by the CPU 31. For the purpose of this description, FIG. 3A illustrates the logical relationships between the virtual machines and the physical modules. Further, it should be understood, that the functionality of one or more of the CP-VM 22, RP-VM$_0$ and RP-VM$_1$ need not be virtual, but can be implemented in a physical device as in the prior art network switch 10 described with reference to FIG. 1.

As described previously with reference to FIG. 2, the two RP-VMs, RP-VM$_0$ and RP-VM$_1$ shown in FIG. 3A implement protocols that generally operate to send information about network device 20 (IP address, port IDs and status, etc.) to other network devices, they operate to receive information from other network devices that network device 20 is able to communicate with and they can operate to detect information in packets or frames of information received from other network devices and which are processed in the data plane of device 20. In this context, other network devices can be a router, switches, aggregators, servers or any device connected to the network that is either the source or destination for packets or frames of information. The information received from other network devices and from local packets can include the IP address and/or MAC address of the other network devices, distance information, link attributes, and group membership information about the other network devices. RP-VM$_0$ and RP-VM$_1$ use the information they receive from the other network devices to derive, among other things, new or updated information that is used to modify a table entry in the first database, for instance. This update information can include the shortest paths to other network devices, the distances to other network devices, aggregation of network devices and spanning tree information or MAC addresses and port IDs and the results of these derivations can be stored in the first database maintained by each of the LC-VMs. An agent running on each of the LC-VMs periodically examines the databases maintained by each LC-VM to identify new information, which can be a next hop address for instance. In the event that the agent does identify new information, it can send this information to the respective physical line card(s) where the new information is stored in a forwarding table (FIB) or other table associated with the LC. In this embodiment, each LC-VM (0-N) maintains a separate instance of both a routing and a MAC table comprising the first database instance. A detailed description of the agents running on an LC-VM is included later with reference to FIG. 3B.

Figure 3B:
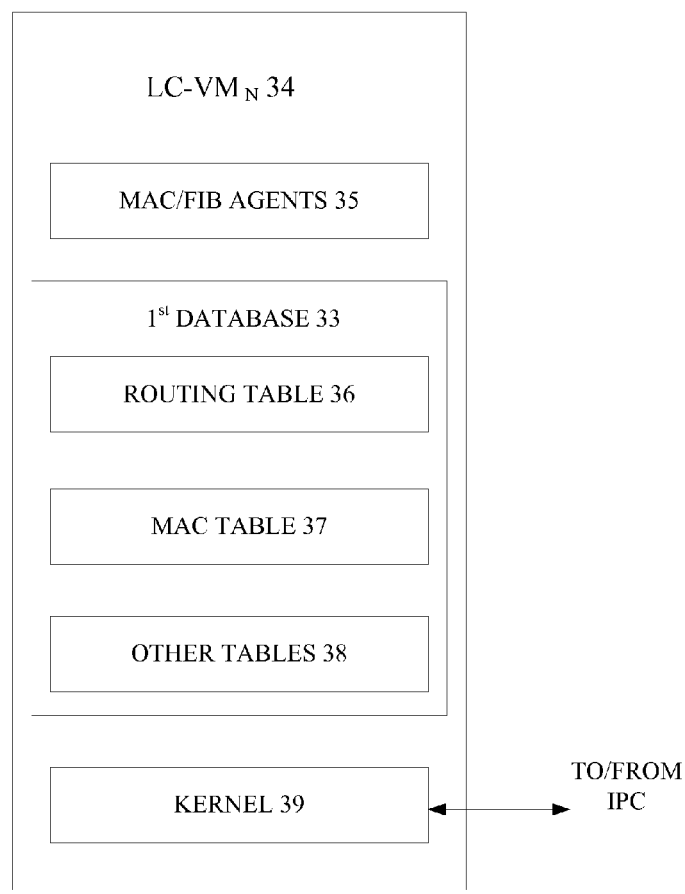
FIG. 3B is a detailed block diagram of another embodiment of the network device of FIG. 2.
Figure 3C:
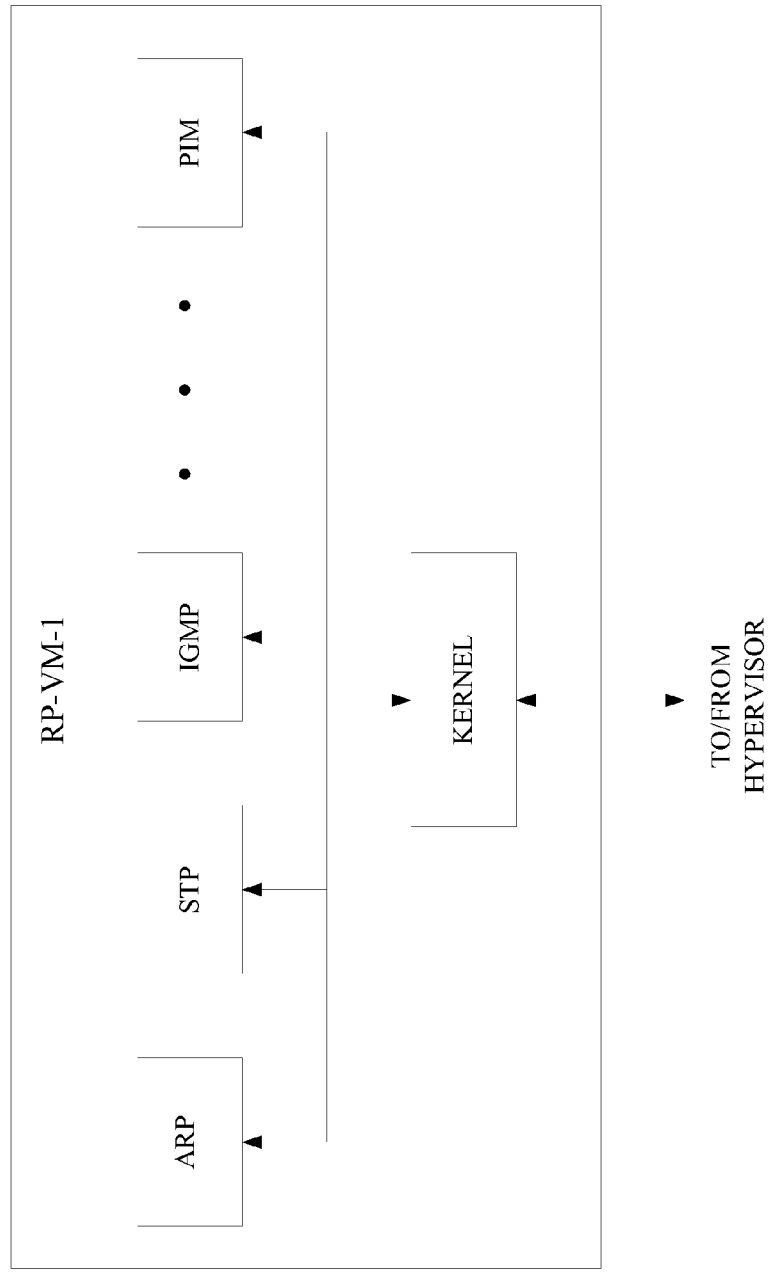
FIG. 3C is detailed block diagram of another embodiment of the network device of FIG. 2.

FIG. 3C is a block diagram showing functionality comprising RP-VM$_1$. RP-VM$_0$ is not described here in the same level of detail as this module operates similarly to RP-VM$_1$ with the primary difference being the network protocols running on it. Among other things, the RP-VM$_1$ is responsible for running layer 2 network protocols such as the address resolution protocol (ARP), the spanning tree protocol (STP), the Internet group management protocol (IGMP), the protocol independent multicast (PIM) protocol and a number of other protocols. Each of these protocols runs in the RP-VM$_1$ as a separate process under the control of the kernel, and all of these protocols are well known to those familiar with the operation of communication networks and so they will not be described here in any detail. The RP-VM$_1$ is also comprised of an instance of a kernel, which in conjunction with the CPU 31 controls the overall operation of the layer 2 protocols running in the RP-VM$_1$.

Referring again to FIG. 3A, and as previously mentioned, all of the virtual processes running on the CM 21 is under the control of a hypervisor, which in this case is the commercially available Xen® hypervisor. The hypervisor is designed to operate in conjunction with a number of commercially available multi-core CPUs which can include an embedded virtualization capability. The primary purpose of including a hypervisor in the network device 20 architecture is so that at least one instance of a operating system kernel can be responsible for running each of the virtual machines in the network device 20. Specifically, a separate instance of a kernel is responsible for running the CP-VM 22, the RP-VM$_0$, the RP-VM$_1$ and a separate instance of a kernel is responsible for running each instance of the LC-VMs. So, in the case that CM 21 supports fourteen instances of a LC-VM, there are seventeen instances of an operating system kernel running (one kernel for each of the CP-VM, two RP-VMs and fourteen LC-VMs). In this case, the NetBSD kernel is used to run each of the virtual machines comprising the CM 21, but other suitable operating system kernels can be used as well.

With continued reference to FIG. 3A, a host kernel running on top of the hypervisor is a specially modified, commercially available operating system kernel, which in this case is a modified Linux kernel. The specially modified kernel has special rights to access physical input/output (IO) resources as well as interact with the CP-VM 22, the VPRMs and the LC-VMs comprising the CM 21. All of the IO messaging to/from the virtual machines (CP-VM 22, RP-VMs and LC-VMs) is handled by the host kernel and the operation of each of the kernel instances running the different virtual machines is managed by the hypervisor.

The functionality and operation of one of the plurality of LC-VM instances will be described now with reference to LC-VM 34 in FIG. 3B. The LC-VM 34 is comprised of several different processes and tables all running under the control of an instance of OS kernel 39 (NetBSD in this case). The processes can include a MAC agent, a FIB agent and other agents collectively referred to here as agents 35. Among other things, these agents operate to construct and maintain a first database 33 comprised of a routing table instance 36 and a MAC table 37 instance. The routing table 36 can be comprised of several entries such as an entry to a destination network id, an entry for a path cost and an entry of a next hop address and other entries associated with quality of service, packet filtering information for instance. The MAC table 37 is typically comprised of a plurality of MAC address and port ID entries. Entries in these tables can be used to construct and maintain forwarding tables in each of the associated physical line cards. The LC-VM 34 also can include separate processes for constructing and maintaining separate instances of other tables 38 (ACL tables, VLAN membership table, QoS tables, MPLS forwarding table, next and first hop tables to name only a few). The kernel 39 is in communication with the host kernel over the IPC bus identified in FIG. 3A. As described previously with reference to FIG. 3A, the agents 35 operate to receive information from the layer 2 and layer 3 network protocols running on RP-VM$_1$ and RP-VM$_0$ respectively and to use this information to update the first database 33.

Continuing to refer to FIG. 3B, the agents 35 also operate to detect changes or modifications information comprising the first database 33 (table entry changes), and in the event that the agent does detect new information, it enters at least some of this new information into a forwarding table or other table associated with at least one of the LC (0-N) described with reference to FIG. 3A. More specifically, the MAC agent 35 is comprised of functionality to configure the first database 33 that is used to store the MAC table 37 information, functionality to maintain a FIB, functionality to learn and age address information, functionality to monitor port state changes, functionality to track VLAN membership, functionality to manage communications with the VPRMs and LCs (0-N) and counter functionality to name just a few of the functions. The agent 35 also identifies modifications to the routing table 36 entries and uses at least some information included in the identified, modified table entry to update a forwarding table or FIB stored on at least one of the line cards (LC 0-N) associated with LC-VM 34. Other tables comprising LC-VM 34 can include ACL tables, a VLAN membership table, QoS tables, a MPLS forwarding table, next and first hop tables to name only a few.

Figure 4A:
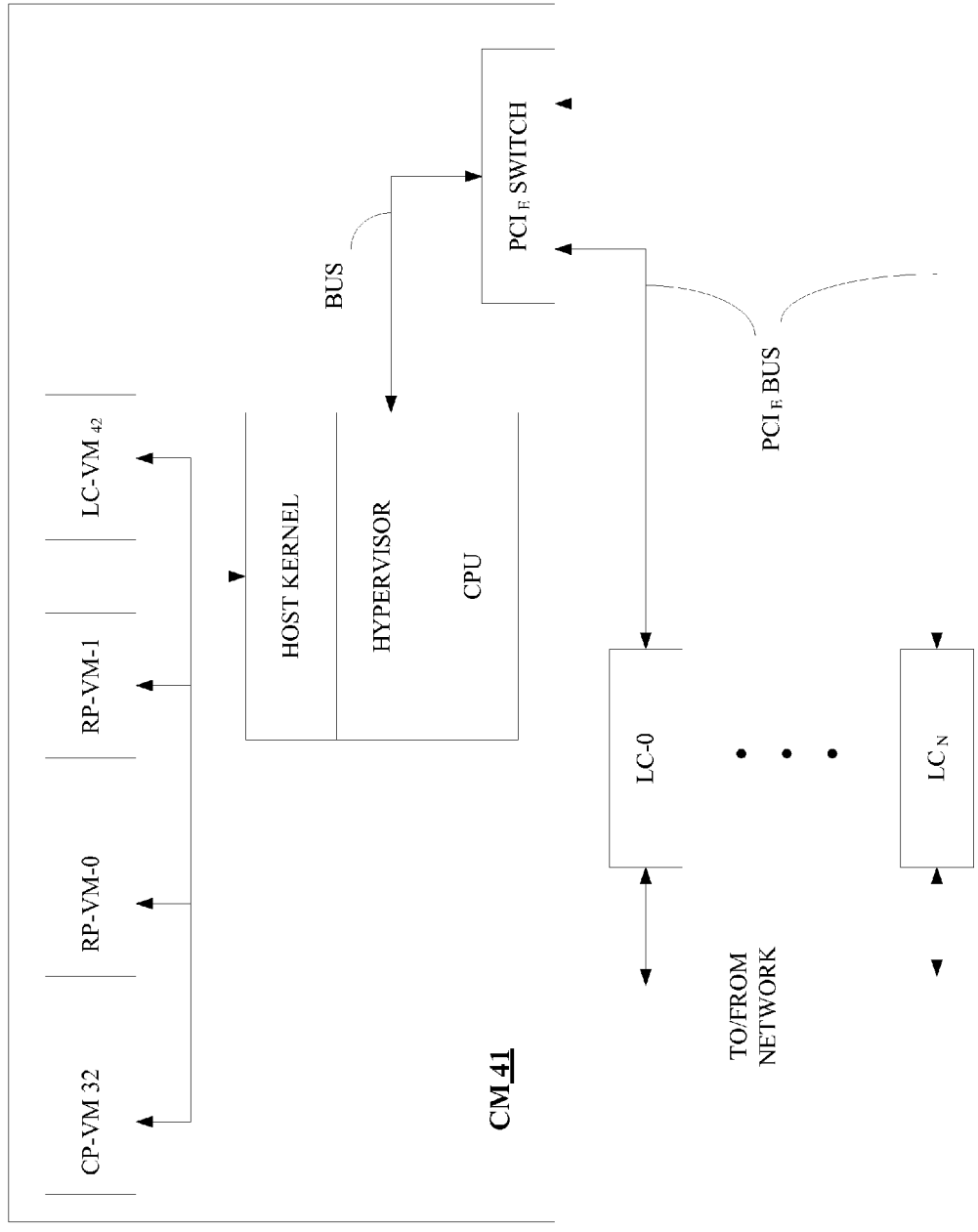
FIG. 4A is a diagram showing the functionality comprising one embodiment of a line card virtual machine.

FIG. 4A is a diagram illustrating another embodiment of a network device architecture comprised of virtual line card functionality. In this embodiment, a control module 41 included in a network device 40 is comprised of the same functionality as the CM 21 in network device 20 described earlier with reference to FIG. 3A; namely, CM 41 is comprised of a CP-VM, two RP-VMs, a single LC-VM, a host kernel, a hypervisor and a CPU connected over a bus to an PCIe switch. One difference between the network device 20 embodiment described with reference to FIG. 3A and this network device 40 is that of the separate LC-VM instances comprising network device 20 are encapsulated in a single, logical LC-VM instance 42 in network device 40. So, if the network device 40 is comprised of fourteen physical line cards (LC 0-13), only a single logical instance of a LC-VM, LC-VM 42, is implemented in the CM 31, and this single LC-VM instance 42 is capable of communicating with each of the fourteen physical line cards comprising the network device 40. Another difference between the embodiment of network devices 20 and 40 is that the single, logical LC-VM 42 instance constructs and maintains only a single instance of a first database, comprised of a routing table and a MAC table, which includes information used to support the operation of all of the physical line cards with which it is associated. This single database architecture is possible because each of the physical line cards use substantially the same routing table information and the same MAC table information to construct their forwarding tables. The LC-VM 42 maintains separate/ different layer 2 and layer 3 tables (ACL tables, VLAN membership table, QoS tables, MPLS forwarding table, next and first hop tables to name only a few) for each one of the physical lines cards with which it can communicate. Each of these tables is generally small in size and more easily maintained than the relative large routing and MAC tables. The functionality and operation of the LC-VM 42 is described below with reference to FIG. 4B.

The functionality comprising LC-VM 42 will now be described with reference to FIG. 4B. The LC-VM 42 is comprised of several different processes and databases all running under the control of an instance of OS kernel 49 (NetBSD in this case). The processes can include a MAC agent and a FIB agent collectively referred to here as agents 45. These agents 45 operate to construct and maintain a first database 44 comprised of a single routing table 46 instance and a single MAC table 47 instance both of which are used to construct and maintain a second database comprised of forwarding tables (FIBs) in each of the physical line cards in the network device 40. The LC-VM 42 also can include separate processes for constructing and maintaining separate instances of other tables 38 (ACL tables, VLAN membership table, QoS tables, MPLS forwarding table, Next and first hop tables to name only a few) for each of the physical line cards included in the network device 42. The kernel 49 is in communication with the host kernel over the IPC bus identified in FIG. 4A. The agents 45 operate to receive information from the layer 2 and layer 3 network protocols running on RP-VM$_1$ and RP-VM$_0$ respectively, and to use this information to update the routing table 46 and the MAC table 47 comprising the first database 44. The agents 45 also operate to detect changes to the routing table 46, the MAC table 47 or any of the other tables maintained by the LC-VM 42 to identify new information (entry changes), and in the event that the agent 45 detects new table information, it can send this information to all of the physical line card(s) where the new routing information is stored in a forwarding table or other table associated with the LC. More specifically, the MAC agent 45 is comprised of functionality to configure the first database 44 and FIBs, functionality to learn and age address information, functionality to monitor port state changes, functionality to track VLAN membership, functionality to manage communications with the VPRMs and counter functionality to name just a few of the functions. The routing table 46 can be comprised of several entries such as an entry to a destination network id, an entry for a path cost and an entry of a next hop address and other entries associated with quality of service, packet filtering information for instance. The agent 45 identifies changes to the routing table 46 and sends this table change information to all of the physical line cards in the network device 40 where it is used to update the forwarding tables. The MAC table 47 can be comprised of several entries such as an entry for a MAC source/ destination address and port ID of another device connected to the network, entries can be static or dynamic and MAC addresses can be unicast or multicast. Other tables maintain in LC-VM 42 can include ACL tables, a VLAN membership table, QoS tables, a MPLS forwarding table, next and first hop tables to name only a few.

Figure 4B:
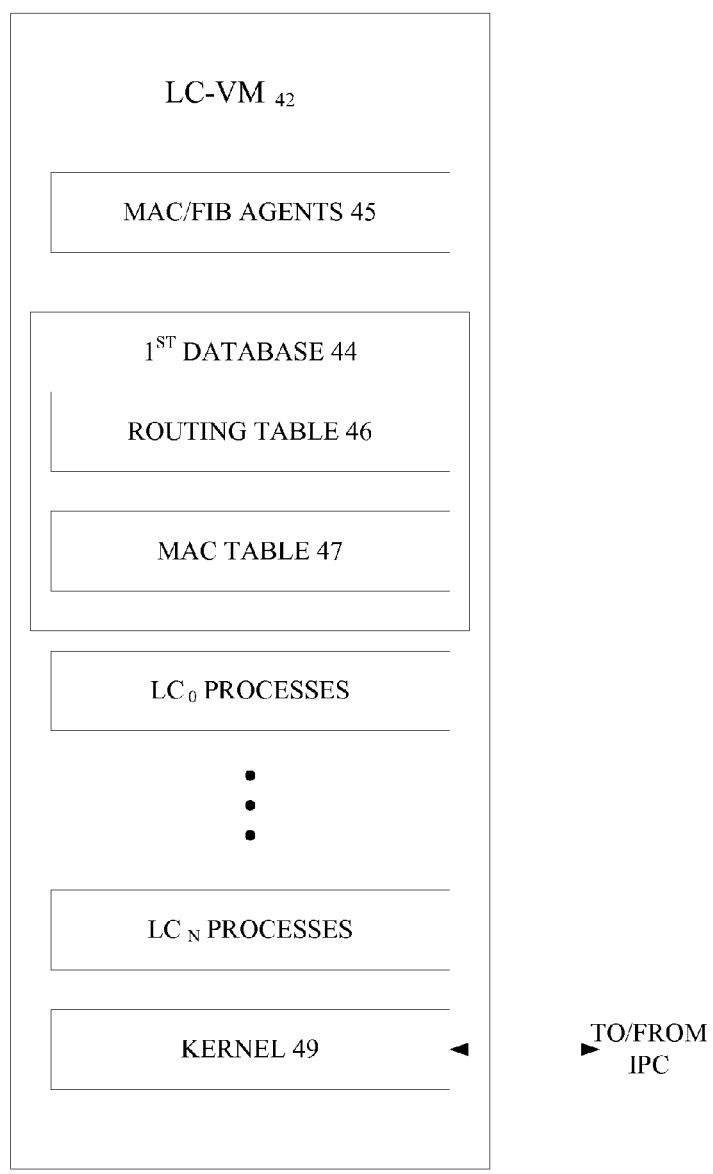
FIG. 4B is a diagram showing the functionality comprising another embodiment of the line card virtual machine.

There are a number of advantages in aggregating all of the LC-VMs into the single logical LC-VM 42 as described in FIG. 4B. One advantage is that there is only a single point of communication for all of the processes running on each of the two RP-VMs. Another advantage is that running a single LC-VM instance 42 consumes less memory than running two or more LC-VMs. This is possible because only one instance of a routing table and one instance of a MAC table need to be constructed and maintained to provide forwarding information to all of the physical line cards in the device 40. Another advantage is that performance and convergence times of routing and switching entries is improved since there are fewer databases to be updated.

Figure 5:
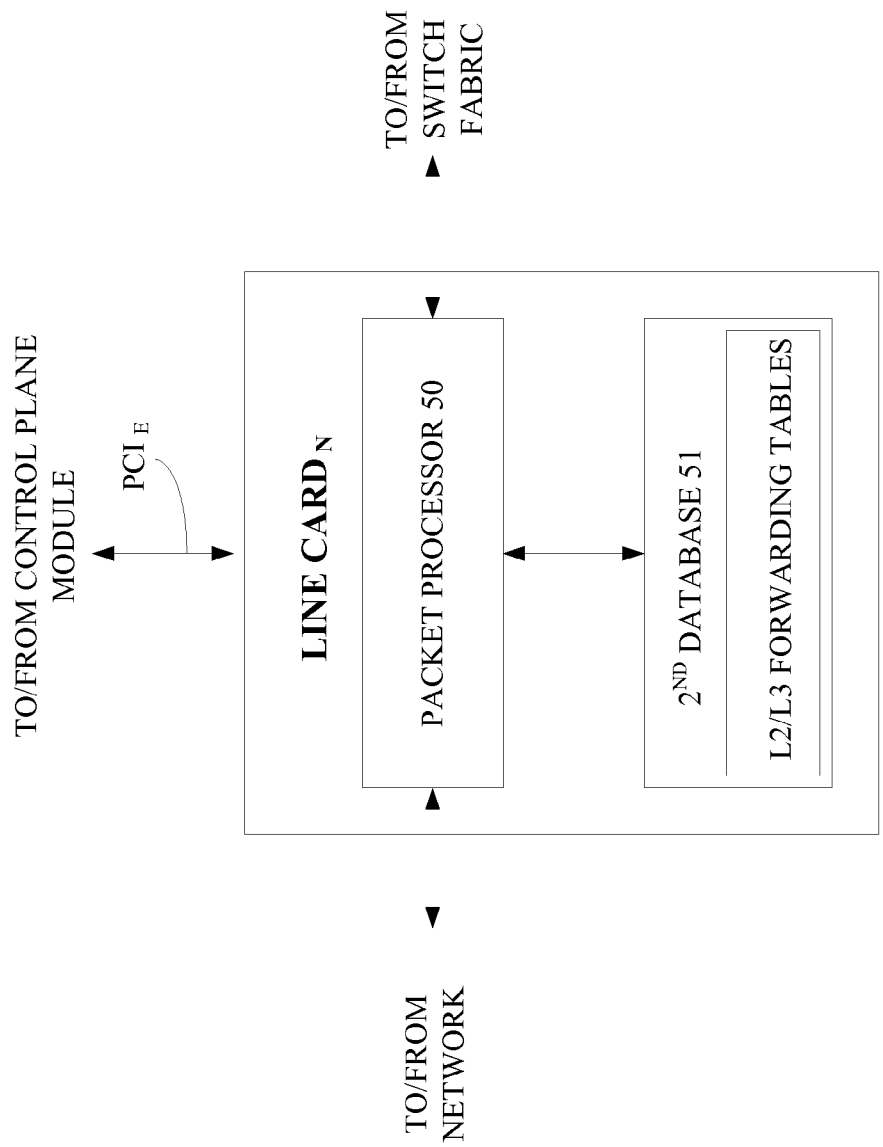
FIG. 5 is a diagram showing the functionality comprising a router processing module.

FIG. 5 is a block diagram of one of the physical line cards (LC 0-N) shown in either FIG. 3A or FIG. 4A. This line card (LC$_n$) includes substantially all of the means to perform forwarding plane functionality comprising a network device and can include, among other things, a packet processor 50 for receiving packets or frames of information at an input port to the line card, examining header and other information included in the packet or frame and using this information as a pointer into a memory 51 in which a layer 2 or layer 3 forwarding table is stored. The line card also includes a second database 51 comprised of L2/L3 forwarding tables that include port and address information used by the packet processor 50 to determine how to forward the received packet or frame of information. Other tables that store forwarding information specific to at least one particular line card (same type of table in each line card, but information stored in table can be different) are maintained database 51. These other tables can include ACL tables, VLAN membership tables, QoS tables, next and first hop tables to name only a few. All of these tables are constructed and maintained by the agents 35 or 45 that respectively comprise any of the LC-VM instances described with reference to FIG. 3B or the single, logical LC-VM instance described with reference to FIG. 4B.

Figure 6:
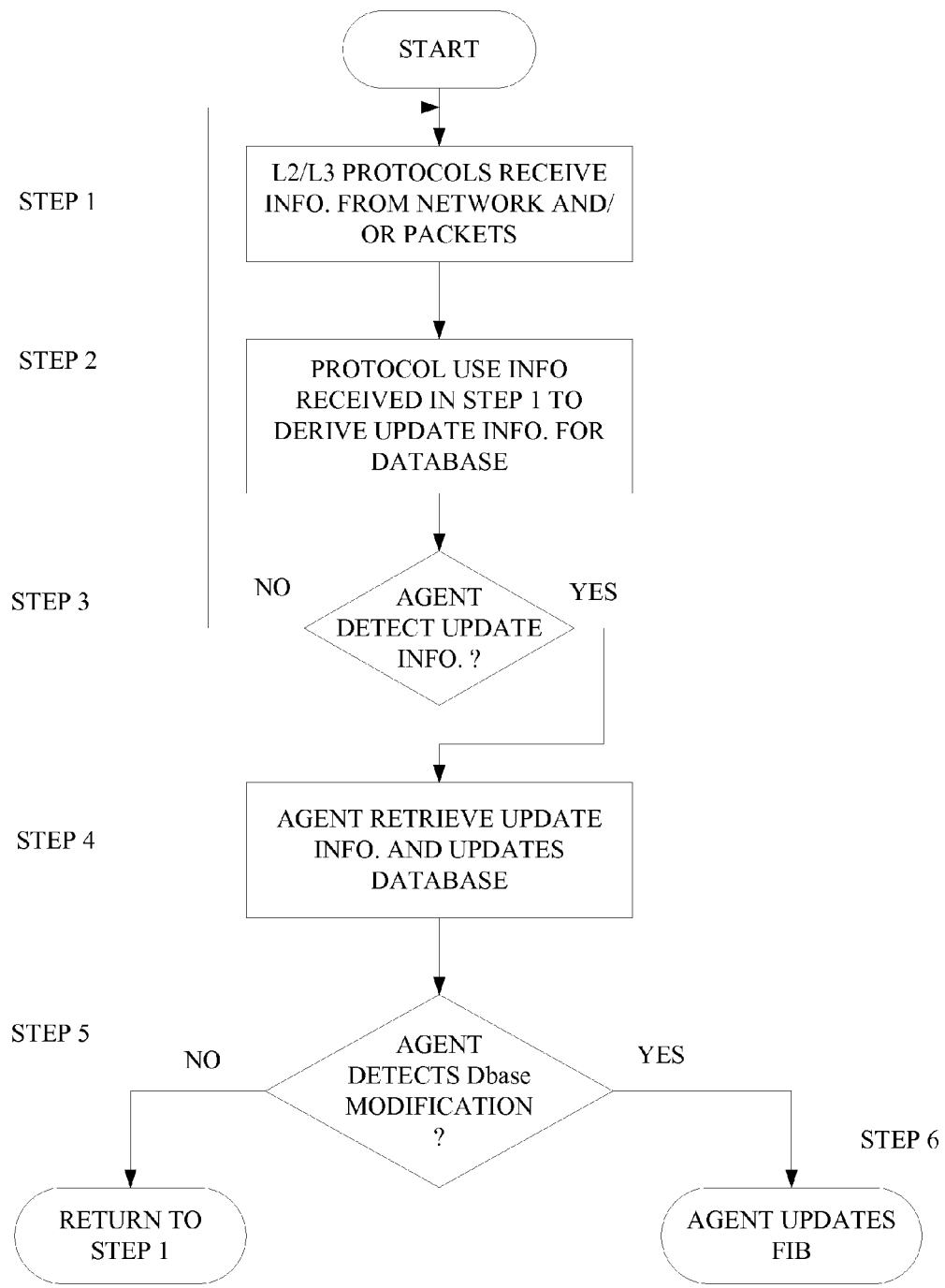
FIG. 6 is a diagram illustrating the hi-level functionality comprising a line card.

FIG. 6 is a logical flow diagram of the process, employed by the embodiment described with reference to FIG. 3A or FIG. 4A, for updating tables used to forward information in the data plane. In step 1, layer 2 network protocols running on $RP-VM_1$ and layer 3 network protocols running on $RP-VM_0$, that comprise either network device 20 or 40, respectively receive layer 2 information from packets or frames being processed by the data plane in the device or topology information from other network devices with which it can communicate. In step 2, this information received by the protocols running on either $RP-VM_0$ or $RP-VM_1$ in step 1 is used to derive updates to a routing table, a MAC table, and other tables stored on a LC-VM instance, such as the LC-VM instances described in FIGS. 3A and 4A. In step 3, if an agent running on a LC-VM detects that a change to a routing or MAC table entry should be made, in step 4 it updates the tables accordingly. Otherwise the process returns to step 1. In step 5, in the event that an agent running on the LC-VM detects a table change in step 4, in step 6 the agent updates the appropriate tables stored on the physical line cards.

It should be understood that while the embodiments described herein are all in terms of the layer 2 and 3 protocols and the agents being virtual processes, not all of these processes need to be virtual. One or more of the process can be implemented on one or more physical CPUs. So for instance, the network protocol functionality can be implemented in a CPU and the MAC and FIB agent functionality can be implemented virtually.

The forgoing description, for purposes of explanation, used specific nomenclature to provide a thorough understanding of the invention. However, it will be apparent to one skilled in the art that specific details are not required in order to practice the invention. Thus, the forgoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

We claim:

1. A network device, comprising:
a chassis housing a backplane;
a plurality of physical line cards housed in the chassis and coupled to the backplane, wherein each of the plurality of physical line cards is free of a layer 2 and layer 3 protocol processor, and wherein each of the plurality of physical line cards includes a physical line card database and is configured to receive at least one packet of information through an ingress port; and
a control module housed in the chassis and coupled to the plurality of physical line cards through the backplane, the control module including:
at least one rout processor virtual machine (RP-VM) that is configured to run at least one network protocol to receive network information over a network; and
at least one line card virtual machine (LC-VM) instance including an LC-VM database and one or more agents that are configured to perform layer 2 and layer 3 actions;
wherein the at least one RP-VM is configured to use the network information to derive an LC-VM database update that is provided to the at least one LC-VM instance, and wherein the one or more agents in the at least one LC-VM instance are configured to provide the LC-VM database update to the physical line card database in at least one of the plurality of physical line cards in response to determining that the LC-VM database update has modified the LC-VM database, and wherein the at least one LC-VM instance is configured, in response to the at least one physical line card receiving the at least one packet of information, to perform layer 2 and layer 3 protocol processing for the at least one physical line card using information stored in the physical line card database of the at least one physical line card to process and forward the at least one packet of information through an egress port.

2. The network device of claim 1, wherein the at least one RP-VM includes a first RP-VM that is configured to run a layer 2 switching protocol and second RP-VM that is configured to run a layer 3 routing protocol.

3. The network device of claim 2, wherein the LC-VM database includes a layer 2 table and a layer 3 table.

4. The network device of claim 1, wherein the one or more agents in the at least one LC-VM instance are configured to use the LC-VM database update to update the LC-VM database, and wherein the one or more agents provide the LC-VM database update to the physical line card database in at least one of the plurality of physical lines cards in response to determining that the LC-VM database update has changed the LC-VM database.

5. The network device of claim 1, wherein the at least one LC-VM instance is a single LC-VM instance.

6. The network device of claim 1, wherein the at least one LC-VM instance includes a respective LC-VM instance for each of the plurality of physical line cards.

7. The network device of claim 1, wherein the LC-VM database update includes a shortest path to another network device, a distance to the other network device, access control list information, spanning tree information and network device aggregation information.

8. The network device of claim 1, wherein the physical line card database in each of the plurality of physical lines cards includes a layer 2 forwarding table and a layer 3 forwarding table.

9. The network device of claim 1, wherein the control module further includes a control processor virtual machine (CP-VM).

10. The network device of claim 9, wherein the control module further includes a host kernel and a hypervisor coupled between the plurality of physical line cards and each of the CP-VM, the at least one RP-VM, and the at least one LC-VM instance.

11. A method of operating a network device comprising:
providing a control module coupled to a plurality of physical line cards through a backplane, wherein the control module, the plurality of physical line cards, and the backplane are all housed in a network device chassis, and wherein each of the plurality of physical line cards is free of a layer 2 and layer 3 protocol processor;
receiving network information by at least one route processing virtual machine (RP-VM) provided by the control module;
deriving a database update from the network information using the at least one RP-VM and providing the database update to at least one line card virtual machine (LC-VM) instance provided by the control module;
detecting that the database update provides a modification to an LC-VM database in the at least one LC-VM instance using an agent in the at least one LC-VM instance and, in response, updating a physical line card database in at least one of the plurality of physical line cards with the database update using the agent; and
receiving at least one packet of information through an ingress port on a first physical line card of the plurality of physical line cards and, in response, using, by the at least one LC-VM instance, information stored in the physical line card database of the first physical line card to perform layer 2 and layer 3 protocol processing for the first physical line card to process and forward the at least one packet of information through an egress port on the first physical line card.

12. The method of claim 11 further comprising:
running at least one network protocol using the at least one RP-VM to receive the network information over a network and provide the database update.

13. The method claim 11 wherein the physical line card database in each of the plurality of physical line cards includes a layer 2 forwarding table and a layer 3 forwarding table.

14. The method of claim 11 wherein the LC-VM database includes a layer 2 table and a layer 3 table.

15. The method of claim 11 wherein the at least one LC-VM instance is a single LC-VM instance.

16. The method of claim 11 wherein the at least one LC-VM instance includes a respective LC-VM instance for each of the plurality of physical line cards.

17. The method of claim 11 wherein the LC-VM database update includes a shortest path to another network device, a distance to the other network device, access control list information, spanning tree information and network device aggregation information.

18. The method of claim 11 wherein at least one entry in the LC-VM database includes a network identifier, a cost, a next hop address and a Media Access Control (MAC) address.

19. The method of claim 18 wherein the cost is the number of hops to a destination network device.

20. The method of claim 11 wherein the control module further includes a control processer virtual machine (CP-VM).

21. The method of claim 20 wherein the control module further includes a host kernel and a hypervisor coupled between the plurality of physical line cards and each of the CP-VM, the at least one RP-VM, and the at least one LC-VM instance.

* * * * *